(12) United States Patent
Caira et al.

(10) Patent No.: US 9,009,687 B2
(45) Date of Patent: Apr. 14, 2015

(54) DE-SERIALIZATION OF OBJECTS BASED ON DIFFERENCE IN INFORMATION CONTENT

(71) Applicant: International Business Machines Corporation, Armonk, NY (US)

(72) Inventors: Maria T. Caira, Rome (IT); Luca Lazzaro, Rome (IT); Alessandro Scotti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 13/859,884

(22) Filed: Apr. 10, 2013

(65) Prior Publication Data

US 2013/0326491 A1 Dec. 5, 2013

(30) Foreign Application Priority Data

May 29, 2012 (GB) .................................. 1209449.6

(51) Int. Cl.
*G06F 9/45* (2006.01)
*G06F 9/44* (2006.01)

(52) U.S. Cl.
CPC .. *G06F 8/48* (2013.01); *G06F 8/51* (2013.01); *G06F 9/4435* (2013.01)

(58) Field of Classification Search
CPC ....................................................... G06F 8/437
USPC ......................................................... 717/146
See application file for complete search history.

(56) References Cited

U.S. PATENT DOCUMENTS

| 7,444,330 | B2 * | 10/2008 | Bernstein et al. ...................... 1/1 |
| 2005/0188356 | A1 * | 8/2005 | Lwo .............................. 717/120 |

(Continued)

FOREIGN PATENT DOCUMENTS

WO WO 2011151111 A1 * 12/2011

OTHER PUBLICATIONS

Patents Act 1977: Report under Section 17(5)(b) and Examination Opinion, UK Application No. GB1209449.6 dated Sep. 13, 2012, 5 pages.

(Continued)

*Primary Examiner* — Philip Wang
(74) *Attorney, Agent, or Firm* — Francis Lammes; Stephen J. Walder, Jr.; Jeffrey S. LaBaw

(57) ABSTRACT

A mechanism is provided for de-serializing a representation of a source object of a source software component written in a source language into a target software component written in a target language. A representation of the source object is received and a determination is made of a set of candidate types among a plurality of available types that are in the target language for the target software component, each candidate type being compatible with the representation of the source type. A set of match metrics is calculated, each one for a corresponding candidate type, where the match metric being indicative of a difference in information content between the candidate type and the representation of the source object. One of the candidate types is selected according to the match metrics and a mapping of the representation of the source object onto a target object of the selected candidate type is created.

20 Claims, 5 Drawing Sheets

(56) References Cited

U.S. PATENT DOCUMENTS

| | | |
|---|---|---|
| 2006/0015842 A1 | 1/2006 | DeSantis |
| 2009/0024986 A1 | 1/2009 | Meijer et al. |
| 2010/0083277 A1 | 4/2010 | Malladi et al. |
| 2011/0119652 A1 | 5/2011 | Yu et al. |
| 2011/0321010 A1 | 12/2011 | Wang |
| 2012/0233182 A1* | 9/2012 | Baudel et al. ............... 707/748 |
| 2013/0174129 A1* | 7/2013 | Grammel et al. ............ 717/136 |

OTHER PUBLICATIONS

Li, Junhuai et al., "A Web Service Adapter with Contract-Oriented Methodology", 2009 Eighth IEEE/ACIS International Conference on Computer and Information Science, Jun. 1-3, 2009, pp. 1144-1149.

Van De Keer, Barbara et al., "A framework for RESTful object exchange through schematized XML (unRESTricted)", Third International Conference on Digital Information Management, ICDIM 2008, Nov. 13-16, 2008, pp. 593-598.

* cited by examiner

DE-SERIALIZATION OF OBJECTS BASED ON DIFFERENCE IN INFORMATION CONTENT

BACKGROUND

The solution according to one or more embodiments of the present invention relates to the data processing field. More specifically, this solution relates to the de-serialization of objects based on differences in information content.

Exchange of data among different software components is a commonplace activity in modern data processing systems. For this purpose, serialization/de-serialization techniques (also known as deflating/inflating techniques) may be used.

Particularly, a source object to be provided from a source software component to a target software component is serialized by converting it into a corresponding representation that may be passed to the target software component. The representation of the source object is then de-serialized by creating a target object in the target software component that maps it (i.e., it is semantically equivalent to the source object). Typically, the representation of the source object is in a format that is independent of the actual implementation of both the source object and the target object; in this way, it is possible to exchange data among heterogeneous software components (especially in data processing systems with distributed architecture) in a reliable manner.

In this context, however, a problem arises when the source software component and the target software component are written in different programming languages that do not support the same types of objects (for example, classes with fields of different types in object-oriented programming languages). Indeed, in this case it may be possible that no type of the target software component perfectly matches the representation of the source object. Therefore, it is quite difficult (if not impossible) to de-serialize the representation of the source object into the corresponding target object automatically.

A typical example is the exchange of objects between a Rich Internet Application (RIA) written in the JavaScript language and a web service written in the Java language, which objects may be represented in the JavaScript Object Notation (JSON) format (trademarks); the Java language has a richer set of types than the JavaScript language has, so that it may be not possible to de-serialize a JSON representation of a JavaScript object into a Java object perfectly mapping it.

In order to tackle this problem, a custom converter is usually added to the target software component; the converter comprises code specifically written for handling the de-serialization of the representations of the source objects into corresponding target objects—for example, as described in US-A-2010/0083277 (the entire disclosure of which is herein incorporated by reference) for de-serializing incoming request messages in a SOA framework into Java objects.

However, this increases the development cost of the target software component. Moreover, the maintenance of the converter is quite difficult, since it requires working on two layers to maintain the converter in the target software component synchronized with the source software component. This process is time-consuming (thereby further increasing the development cost of the target software component) and prone to errors (thereby adversely affecting the quality of the target software component). The problem is particular acute when the source objects have a complex structure (for example, a list of items of different types, a list of nested lists, and the like).

Alternatively, US-A-2011/0321010 (the entire disclosure of which is herein incorporated by reference) mentions the possibility of using a new format, which allows specifying the type of each source object and its fields. However, the use of this format would require a corresponding parser that is not described in the cited document (and it does not have any reference implementation). Moreover, metadata modeling each source object would be required both in the definitions of the source objects (in the new format) and in the target software component; this involves the replication of information with detrimental effects on its maintenance. At the end, the possibility mentioned in the cited document would require the learning of a new language (different from the ones commonly known at the moment).

SUMMARY

In its general terms, the solution according to one or more embodiments of the present invention is based on the idea of automating (at least in part) the de-serialization.

Particularly, one or more aspects of the solution according to specific embodiments of the invention are set out in the independent claims and advantageous features of the same solution are set out in the dependent claims, with the wording of all the claims that is herein incorporated verbatim by reference (with any advantageous feature provided with reference to a specific aspect of the solution according to an embodiment of the invention that applies mutatis mutandis to every other aspect thereof).

More specifically, an aspect of the solution according to an embodiment of the invention provides a method for de-serializing a representation of a source object of a source software component into a target software component, wherein one of a set of candidate types being compatible with the representation of the source type (among a plurality of types being available for the target software component) is selected for mapping the source object according to a difference in information content between the candidate types and the representation of the source object.

Another aspect of the solution according to an embodiment of the invention provides a computer program for performing this method.

Another aspect of the solution according to an embodiment of the invention provides a corresponding system.

BRIEF DESCRIPTION OF THE SEVERAL VIEWS OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
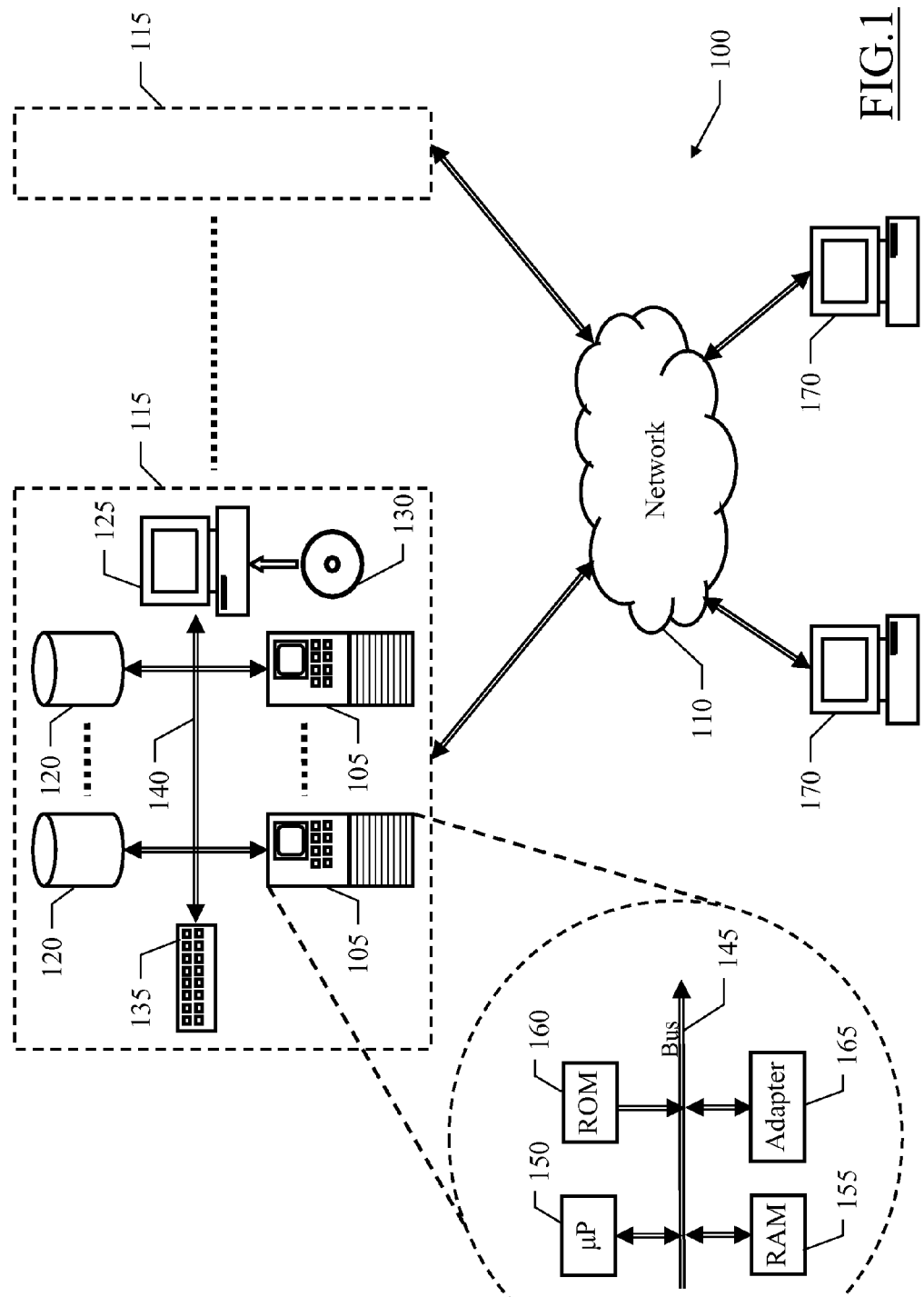
FIG. 1 shows a schematic block diagram of a system wherein the solution according to an embodiment of the invention may be applied.

With reference in particular to the FIG. 1, a schematic block diagram is shown of a system 100 wherein the solution according to an embodiment of the invention may be applied.

The system 100 has a distributed architecture, typically based on the Internet; the Internet is formed by millions of server computers (or simply servers) 105, which are connected among them through a global communication network 110; a subset of the servers 105, known as World Wide Web or simply web, allows accessing corresponding web sites.

The servers 105 are generally grouped in server farms 115. A generic server farm 115 is formed by several data processing units, comprising the corresponding servers 105 (for example, of the rack or blade type) and storage disks 120 (for example, of the RAID type); the server farm 115 also comprises a console 125 for controlling the servers 105 and the disks 120 (for example, a personal computer, also provided with a drive for reading DVD- or CD-ROMs 130). A switch/router system 135 manages communications among the servers 105, the disks 120 and the console 125, and with the network 110; for this purposes, the servers 105, the disks 120 and the console 125 are connected to the switch/router system 135 through a cabling system 140. The server farm 115 is also provided with a cooling system (not shown in the figure), which is used to maintain its temperature at a value ensuring the correct operation of the servers 105.

A generic server 105 is formed by several units that are connected in parallel to a communication bus 145. In detail, a set of (one or more) microprocessors (µP) 150 controls operation of the server 105; a RAM 155 is directly used as a working memory by the microprocessors 150, and a ROM 160 stores basic code for a bootstrap of the sever 105. Moreover, the server 105 comprises a network adapter 165, which is used to connect the server 110 to the cabling system 140.

Users of client computers (or simply clients) 170 access the Internet (through computers that operate as access providers, not shown in the figure), in order to exploit the services offered by the servers 105, and particularly to access their web sites by means of a web browser.

For example, a generic client 170 may run a RIA. The RIA is a software application that runs within a software framework of the web browser; the RIA may provide functionalities comparable to the ones of standard desktop applications, but without requiring its installation on the client 170. The RIA exploits web services (i.e., services each one having an interface formally described in a public WSDL document)—for example, by using AJAX techniques; the web services are provided by the servers 105—for example, within an application server, such as the Tivoli Integrated Portal (TIP) running on the WebSphere by IBM Corporation (trademarks). For this purpose, the RIA and the web service need to exchange data in the form of corresponding objects.

The RIA is generally written in JavaScript; JavaScript is a scripting language, which is interpreted from source code by a JavaScript engine. The web service, instead, is generally written in (pure) Java; Java is a high-level language that is compiled from source code into (platform-independent) byte-code, which in turn is executed by a Java Virtual Machine (JVM). Both JavaScript and Java are object-oriented programming languages, which involve the manipulation of objects instantiating classes each one embedding the definition of both data (in corresponding fields) and functions (in methods that may be applied to the fields). Moreover, both JavaScript and Java are typed languages (wherein each field is associated with a type defining its possible values and the operations that may be performed thereon); however, JavaScript features weak, or loose, typing (i.e., allowing a large number of implicit or explicit type conversions), whereas Java features strong typing (i.e., placing severe restrictions on type conversions).

The objects to be exchanged between the RIA (i.e., JavaScript objects) and the web service (i.e., Java objects) may be represented in the JSON format. JSON is a language-independent data format of the text type (which is derived from a subset of JavaScript). JSON lacks semantics, with any data element (or JSON element) that is simply represented with a name/value pair (colon-separated); the value may be a string, a number, a Boolean, a null value, an array (i.e., an ordered sequence of values, comma-separated and enclosed in square bracket), or an object (i.e., an unordered collection of data elements, comma-separated and enclosed in curly braces). Since JavaScript is a superset of JSON and it features weakly typing, any JSON representation may always be mapped onto a JavaScript object perfectly matching it (for example, by invoking the eval() function, even if it is recommend to use a JSON parser for security reasons); conversely, since Java defines several data types that are not supported by JSON and it features strong typing, it is not always possible to map a JSON object onto a Java object perfectly matching it.

Figure 2:
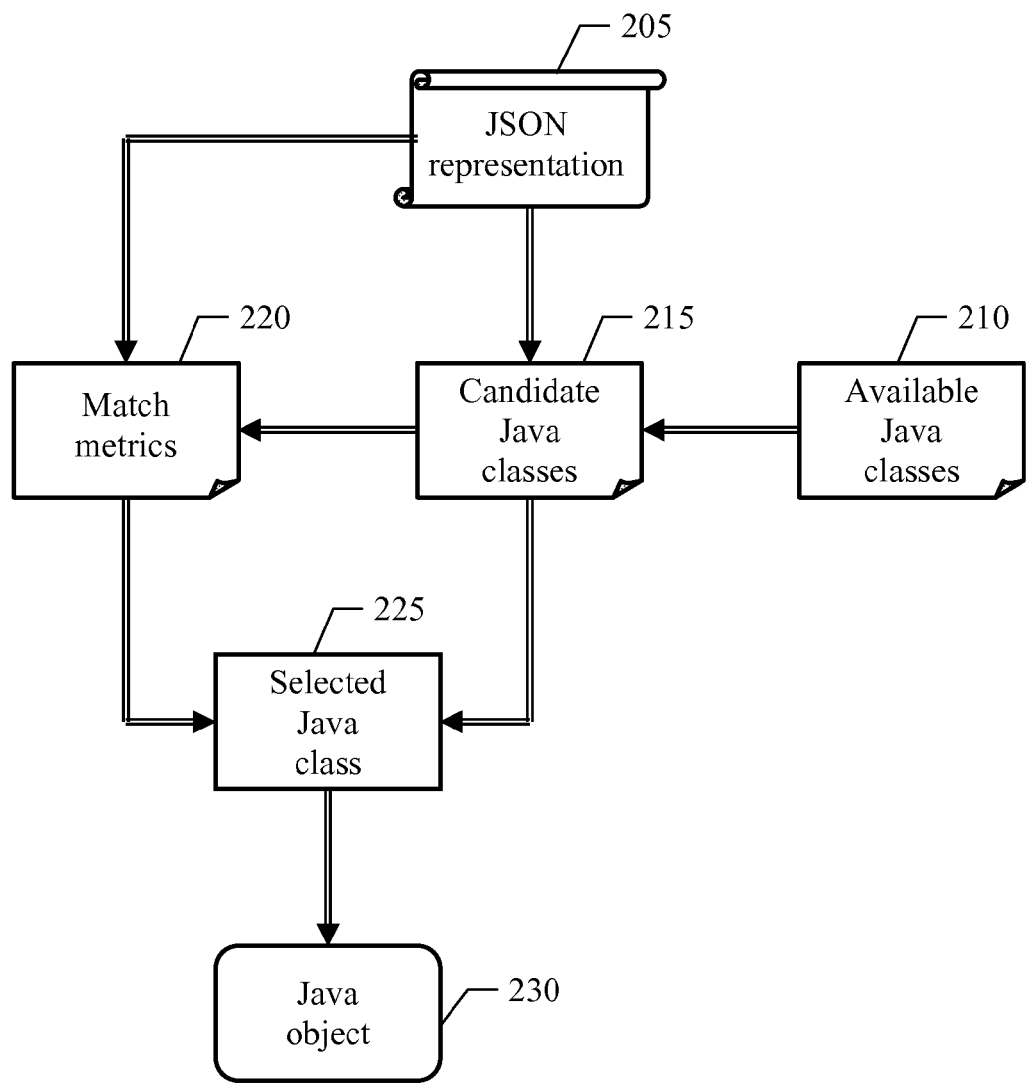
FIG. 2 shows an exemplary scenario of application of the solution according to an embodiment of the invention.

Moving now to the FIG. 2, an exemplary scenario of application of the solution according to an embodiment of the invention is shown.

A generic server receives (from a generic client) the JSON representation 205 of a JavaScript object to be mapped onto a corresponding Java object in its web service; the server also accesses a list of Java classes 210 that are available for the web service (for example, determined when they are loaded). The server selects a set of candidate Java classes 215 among the available Java classes 210, which candidate Java classes 215 are compatible with the JSON representation 205 (for example, having Java fields corresponding to the JSON elements with correct methods for getting/setting them). For each candidate Java class 215, the server calculates a match metric 220, which is indicative of a difference in information content between the candidate Java class 215 and the JSON representation 205 (for example, based on lost JSON elements of the JSON representation that cannot be assigned to the candidate Java class 215, and on exceeding Java fields of the candidate Java class 215 that cannot be assigned by the JSON representation 205). The server selects a Java class 225 among the candidate Java classes 215 according to their match metrics 220 (i.e., the one providing the lowest difference in information content). The server then maps the JSON representation 205 onto a Java object 230 instantiating the selected Java class 225.

The above-described solution makes the de-serialization (of the JSON representation 205 into the Java object 230, or more generally of any representation of a source object into a target object) substantially automatic, at least in part. Indeed, in most practical situations the target object may be created without any manual intervention even if it does not match the representation of the source object perfectly (thereby automatically handling any discrepancies and misalignments with the representation of the source object). Therefore, it is possible to avoid the need of any custom converter specifically written for handling the de-serialization. This significantly reduces the development cost of the web service (or more generally of any target software component), and it simplifies the maintenance thereof; all of the above also has a beneficial effect on the quality of the target software component (especially when the source objects to be mapped therein have a complex structure).

Figure 3:
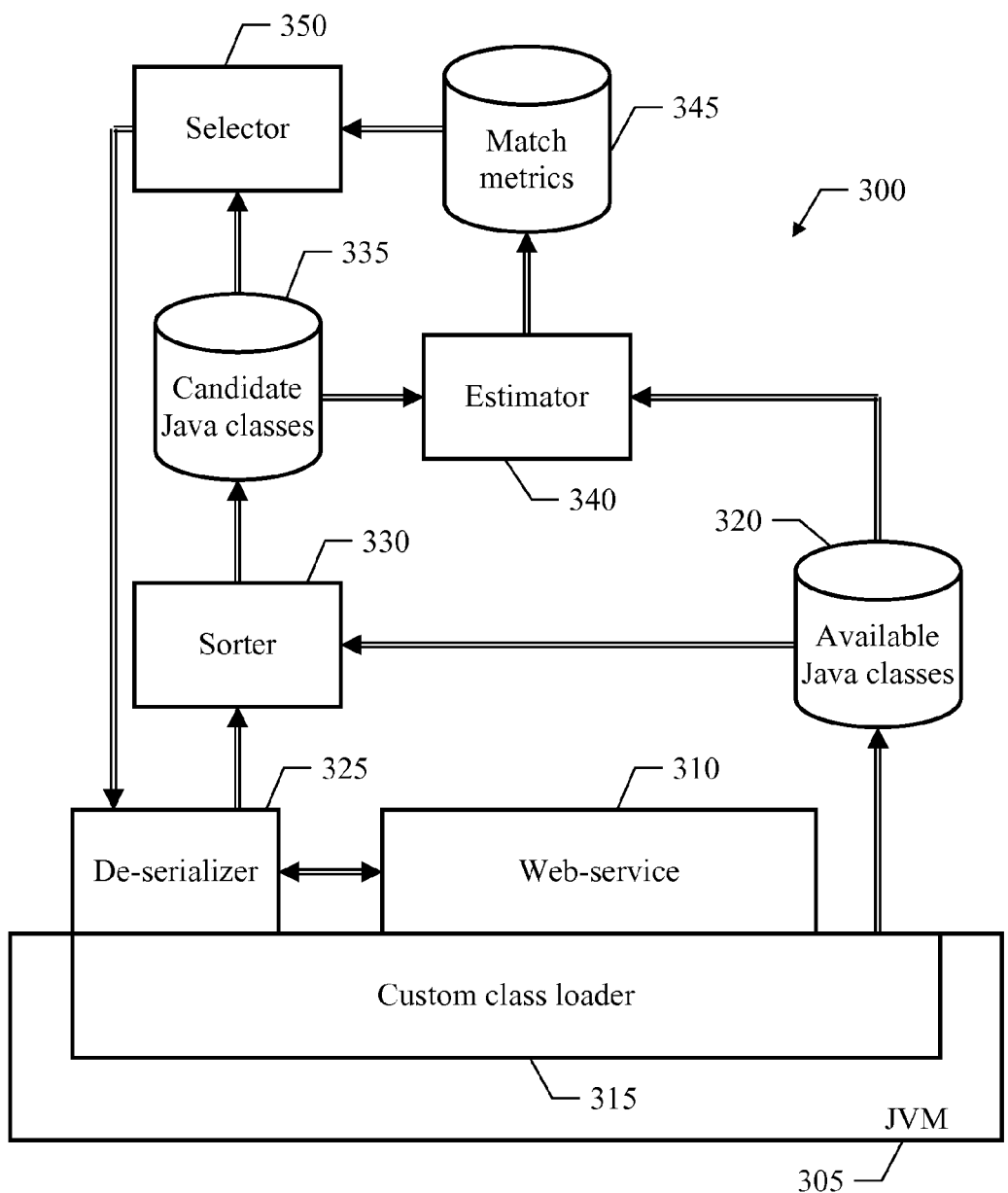
FIG. 3 shows the main software modules that mat be used to implement the solution according to an embodiment of the invention.

The main software modules that mat be used to implement the solution according to an embodiment of the invention are shown in the FIG. 3. These software modules are denoted as a whole with the reference 300. The information (programs and data) is typically stored in the disks of the corresponding server farm and loaded (at least partially) into the working memory of a generic server thereof when the programs are running, together with an operating system and other application programs (not shown in the figure). The programs are initially installed onto the disks, for example, from DVDs through the corresponding console.

The server comprises a JVM 305, on top of which a generic web service 310 runs; particularly, a class loader 315 of the JVM 305 is in charge of controlling the loading of the definition of any new class required by the web service 310 (from a corresponding class file storing its bytecode). The class loader 315 is customized to update a table 320, which stores the list of available Java classes for the web service 310, together with their definition (comprising the specification of the corresponding methods).

The server also comprises a general-purpose de-serializer 325 (running on top of the JVM 305 as well); the de-serializer 325 interfaces with the web service 310 for de-serializing the JSON representation of any JavaScript object that is received from the clients (not shown in the FIG.). For this purpose, the de-serializer 325 passes the JSON representation to a sorter 330, which also accesses the table 320 of the available Java classes. The sorter 330 determines the candidate Java classes (being compatible with the JSON representation among the available Java classes), and stores their names into a table 335. An estimator 340 accesses both the table 320 of the available Java classes and the table 335 of the candidate Java classes (and it also receives the JSON representation from the sorter 330, not shown in the figure for the sake of simplicity). For each candidate Java class, the estimator 340 calculates the corresponding match metric and stores it into a table 345; particularly, the match metric comprises a loss index that measures the lost JSON elements (of the JSON representation) that cannot be assigned to corresponding Java fields of the candidate Java class, and an excess index that measures the exceeding Java fields (of the candidate Java class) that cannot be assigned by corresponding JSON elements. A selector 350 accesses both the table 335 of the candidate Java classes and the table 345 of the match metrics; the selector 350 selects a Java class among the candidate Java classes according to their match metrics, and returns its name to the de-serializer 325 that in turn passes it to the web service 310.

Figure 4A:
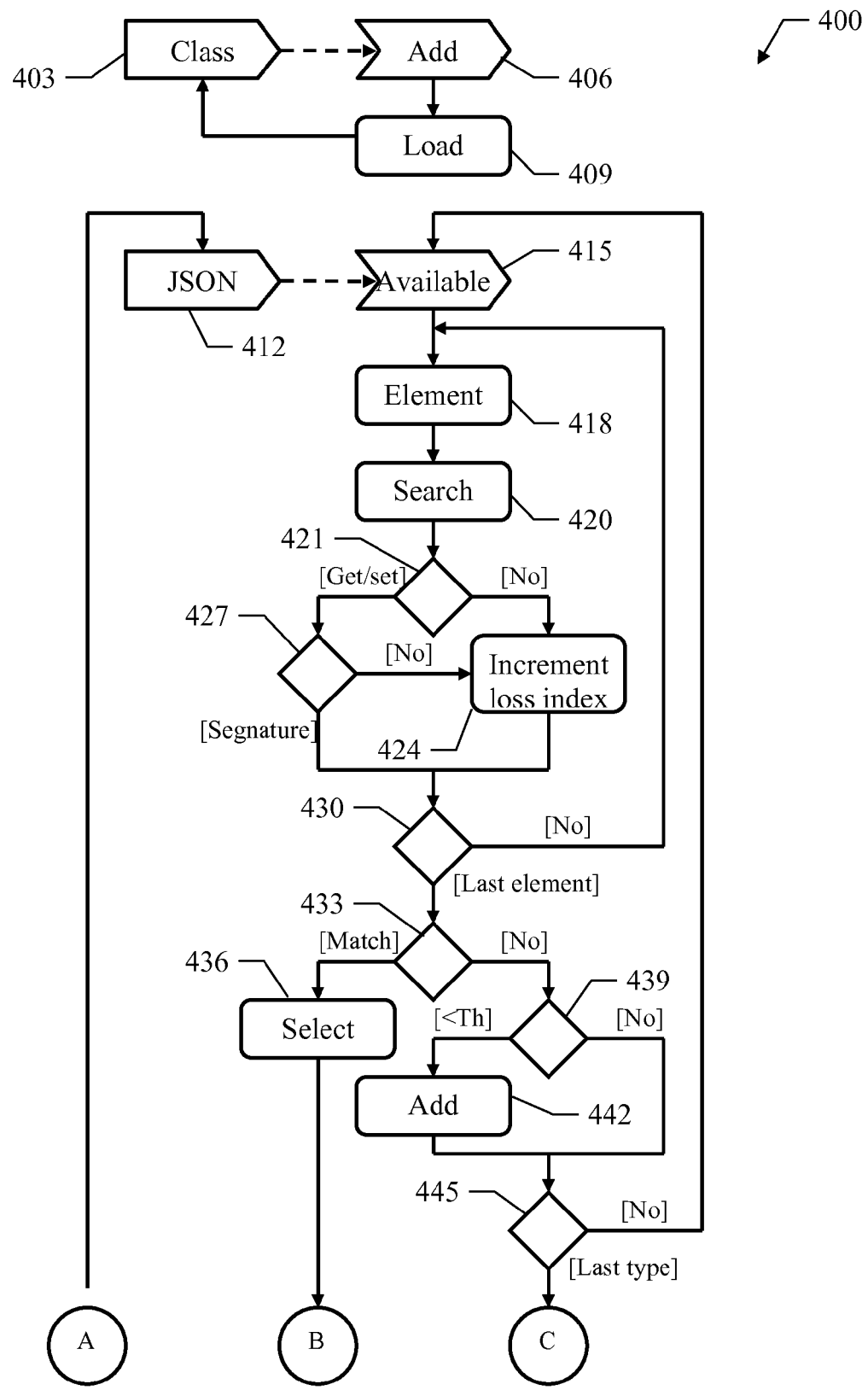
FIG. 4A-FIG. 4B show an activity diagram describing the flow of activities relating to an implementation of the solution according to an embodiment of the invention.
Figure 4B:
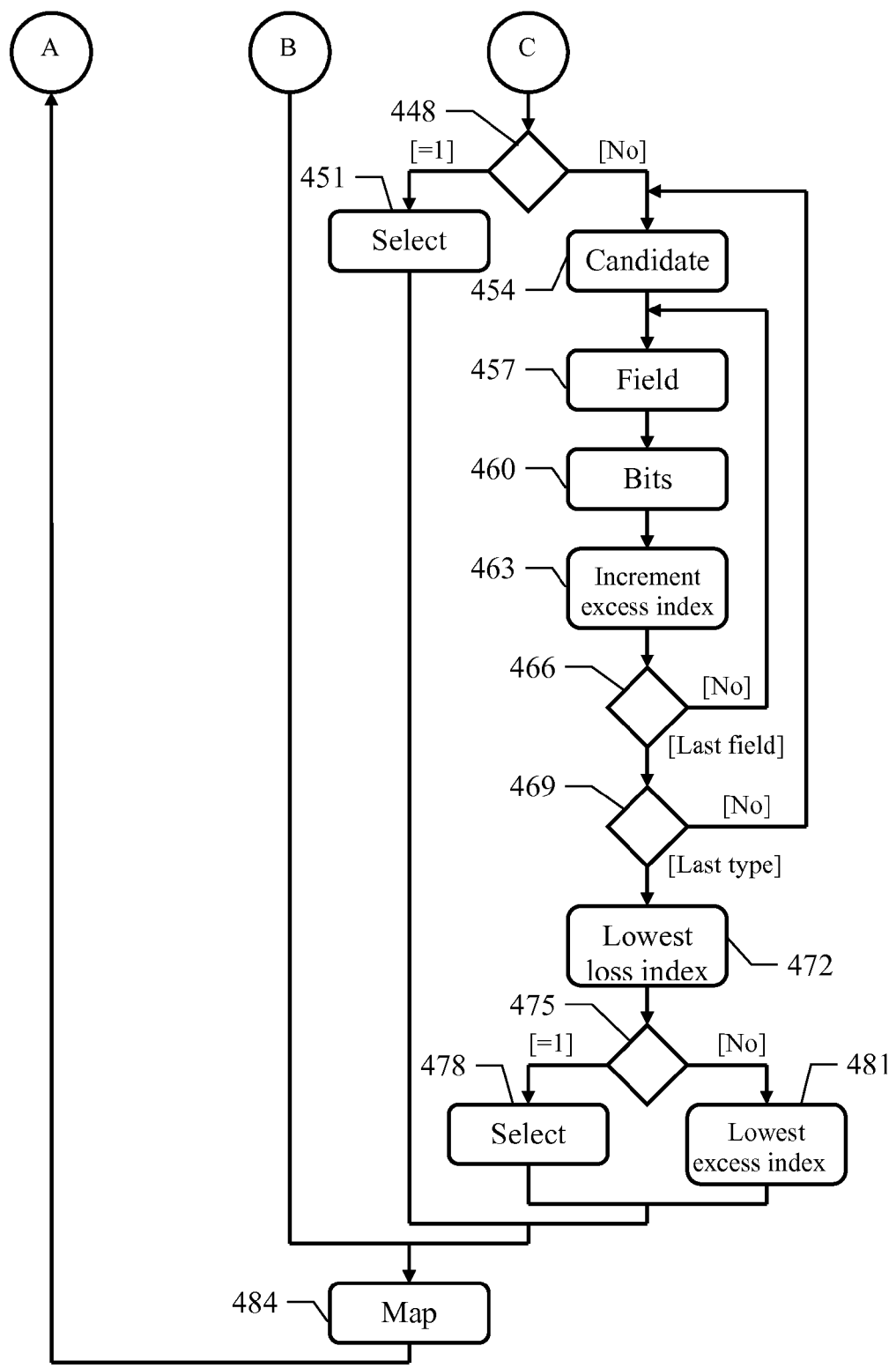

An activity diagram describing the flow of activities relating to an implementation of the solution according to an embodiment of the invention is shown in the FIG. 4A-FIG.-4B. In this respect, each block in the diagram may represent a module, segment, or portion of code, which comprises one or more executable instructions for implementing the specified logical function(s). Particularly, the diagram represents an exemplary process that may be implemented in a generic server for de-serializing JSON representations of JavaScript objects (received from any clients) into corresponding Java objects with a method 400.

The method passes from block 403 to block 406 as soon as the class loader receives a request of loading a new class by the web service. In response thereto, the class loader adds the name of the new class to the list of available Java classes for the web service. Continuing to block 409, the definition of the new class is loaded as usual (with the addition of the definition of its methods to the list of available Java classes). The flow of activity then returns to the block 403 waiting for a next request from the web service.

In this way, the list of available Java classes is determined in a fully automatic way while the web service runs, without requiring any initialization thereof.

In a completely asynchronous way, the method passes from block 412 to block 415 as soon as the JSON representation of a JavaScript object is received by the web service (for example, within a HTTP command submitted by a generic client). In response thereto, an outer loop is performed for each available Java class (starting from the first one); the loop begins by retrieving the definition of the methods of a current available Java class, and setting its loss index to zero. The method then enters an inner loop at block 418 for each JSON element of the JSON representation (starting from the first one). Continuing to block 420, the definition of the methods of the available Java class is scanned for searching a getter method and a setter method for getting and setting, respectively, a Java field (of the available Java class) with the same name of a current JSON element. For example, when the available Java classes comply with the naming convention of JavaBeans, the getter method of a generic Java field my Field of a generic type myType has the following signature:

public myType getMyField( ), meaning that the method is public, returns a result of the type myType, is called with the keyword get followed by the name of the Java field myField, and does not require any argument; alternatively, if the type myType is Boolean, the getter method may also have the following alternative signature:

public boolean isMyField( ).

Likewise, the setter method of the same Java field has the following signature:

public void setMyField(myType), meaning that the method is public, does not return any result, is called with the keyword set followed by the name of the Java field myField, and requires an argument of the type myType.

The method branches at block 421 according to the result of the above-mentioned search. If the getter method and/or the setter method for the JSON element have not been found, the loss index of the available Java class is incremented by one at block 424 to indicate that the JSON element cannot be assigned to any Java field of the available Java class. Conversely, if both the getter method and the setter method for the JSON element have been found, their signatures are compared with the value of the JSON element at block 427. If the signature of the getter method and/or the signature of the setter method are not compatible with the value of the JSON element (i.e., the result of the getter method cannot take this value and the same value cannot be passed as argument to the setter method), the method again passes to the block 424 (to increment the loss index of the available Java class). The flow of activity then merges at block 430 from the block 424 or directly from the block 427, when both the signature of the getter method and the signature of the setter method are compatible with the value of the JSON element.

In any case, a test is now made to determine whether the last JSON element has been processed. If not, the method returns to the block 418 to repeat the same operations on a next JSON element. Conversely (once all the JSON elements of the JSON representation have been processed), the inner loop is exit by descending into block 433. In this phase, there is verified whether the available Java class perfectly matches the JSON representation; this condition is met when all the JSON elements may be assigned to the Java fields (i.e., the loss index is zero) and vice-versa (i.e., the available Java class does not have any further Java field identified by a corresponding setter method and getter method). If so, the available Java class is directly selected for mapping the JSON representation at block 436.

Conversely, the method passes to block 439, wherein the loss index of the available Java class is compared with a threshold (for example, equal to 0-30% with respect to the total number of JSON elements). If the loss index does not reach this threshold (meaning that the amount of information of the JSON representation that is lost because its JSON elements cannot be assigned to corresponding Java fields is acceptable), the name of the available Java class is added to the list of candidate Java classes at block 442. The method then descends into block 445; the same point is also reached directly from the block 439 when the loss index reaches the threshold (i.e., it is equal to or greater than it).

In any case, a test is now made to determine whether the last available Java class has been processed. If not, the method returns to the block 415 to repeat the same operations on a next available Java class. Conversely (once all the available Java classes have been processed), the outer loop is exit by descending into block 448.

In this phase, the number of candidate Java classes is verified. If only a single candidate Java class has been found, this candidate Java class is directly selected for mapping the JSON representation at block 451.

Conversely, the method passes to block 454, wherein an outer loop is performed for each candidate Java class (starting from the first one); the loop begins by determining the exceeding Java fields of a current candidate Java class (i.e., the Java fields, each one identified by a corresponding setter method and getter method, that have not been associated with corresponding JSON elements in the foregoing), and setting its excess index to zero. The method then enters an inner loop at block 457 for each exceeding Java field (starting from the first one); In this phase, the type of the exceeding Java field is determined (as indicated in the signature of its setter/getter methods). Continuing to block 460, the (maximum) number of bits that are required to represent the type of the exceeding Java field is determined (for example, 1 bit for Boolean, 64 bits for double integer, and the like). The method then passes to block 463, wherein the excess index of the candidate Java class is incremented by the number of bits of the exceeding Java field to indicate that this amount of information cannot be assigned in the candidate Java class by the JSON representation.

A test is made at block 466 to determine whether the last exceeding Java field has been processed. If not, the method returns to the block 457 to repeat the same operations on a next exceeding Java field. Conversely (once all the exceeding Java fields have been processed), the inner loop is exit by descending into block 469. A further test is now made to determine whether the last candidate Java class has been processed. If not, the method returns to the block 454 to repeat the same operations on a next candidate Java class. Conversely (once all the candidate Java classes have been processed), the outer loop as well is exit by descending into block 472.

In this phase, the candidate Java classes with the lowest loss index are determined. The number of candidate Java classes so determined is verified at block 475. If only a single candidate Java class has been found, this candidate Java class is selected for mapping the JSON representation at block 478. Conversely, the method passes to lock 481, wherein the candidate Java class with the lowest excess index among them is selected for mapping the JSON representation (by taking any one of them if again more than one).

The flow of activity then merges at block 484 from the block 436, from the block 451, from the block 478 or from the block 481. In any case, a Java object is created by instantiating the selected Java class; the JSON representation is then mapped onto this Java object, by initializing the Java fields thereof associated with the JSON elements to their values. The method then returns to the block 412 waiting for a next JSON representation.

The above-described algorithm selects the Java class to be used for mapping the JSON representation with a heuristic approach; this automatically determines the Java class that should best-match the JSON representation, so as to increase the probability of being able to construct a valid, functioning Java object from its instantiation. Particularly, the above-described two-stage procedure at first reduces the amount of information of the JSON representation that is lost in the Java object; for the same conditions, this procedure then reduces the amount of information that is exceeding in the Java object.

For example, let consider the following JSON representation:

```
{
    "name1": 123
    "name2": false
    "name3": "abc"
},
``` which comprises three JSON elements with names name1, namet2 and name3 and with integer, Boolean and string values, respectively.

Three Java classes available for mapping the JSON representation (class1, class2 and class3) expose the following methods:

```
Class class1
    public int getName1( )
    public void setName1(int)
    public boolean getName2( )
    public void setName2(boolean)
    public string getName3( )
    public void setName3(string)
    public double getName4( )
    public void setName4(double)
Class class2
    public int getName1( )
    public void setName1(int)
    public boolean getName2( )
    public void setName2(boolean)
    public string getName3( )
    public void setName3(string)
    public boolean getName4( )
    public void setName4(boolean)
Class class3
    public boolean getName1( )
    public void setName1(boolean)
    public boolean getName2( )
    public void setName2(boolean)
    public string getName3( )
    public void setName3(string).
```

In this case, assuming that the threshold for the loss index is 0 (meaning that all the JSON elements have to be assigned to corresponding Java fields), only the available Java classes class1 and class2 are candidate to map the JSON representation; conversely, the available Java class class3 is discarded since the JSON element name1 cannot be assigned to any Java field thereof (being its value 123 incompatible with the Boolean type of the setter/getter methods for its name). The excess index of the Java class class1 is 64 bits (for the field name4 of the double integer type), whereas the excess index of the Java class class2 is 1 bit (for the field name4 of the Boolean type). Therefore, the Java class class2 is selected for mapping the JSON object.

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variable involved), and the term a/an should be intended as one or more items (unless expressly indicated otherwise).

For example, an embodiment of the present invention provides a method for de-serializing a representation of a source object of a source software component written in a source language into a target software component written in a target language. The method comprises the following steps. The representation of the source object is received. A set of (one or more) candidate types is determining among a plurality of available types, which are available in the target language for the target software component; each candidate type is compatible with the representation of the source type. A set of match metrics is calculated, each one for a corresponding candidate type; the match metric is indicative of a difference in information content between the candidate type and the representation of the source object. One of the candidate types is selected according to the match metrics. The representation of the source object is mapped onto a target object of the selected candidate type.

However, the source language, the target language and the representation of the source object may be of any type, the candidate types may be determined among the available types in any way, the match metrics may be calculated in any way, and the candidate type to be used to map the representation of the source object may be selected in any way (see below). Moreover, the same method may be applied to any source and target software components, even outside the web realm (for example, a desktop application and a remote legacy application, respectively).

In an embodiment of the invention, the source language is a programming language featuring weakly typing, the target language is a programming language featuring strong typing, and the representation of the source object is written in a language-independent format lacking semantics.

However, the source language, the target language and the format of the representation of the source object may of any type (for example, with both languages featuring strong typing, with the format dependent on one of these languages, and the like).

In an embodiment of the invention, the source language is JavaScript, the target language is Java, and the format is JSON.

However, the above-mentioned examples are merely indicative and in no way limitative. More generally, the same method may also be applied to any other language (even a conventional language wherein the types simply relate to their variables)—for example, C, C++, PHP, Python. Perl, SQL, Ruby, VisualBasic, and the like (trademarks); likewise, the representation of the source object may be in any other format (for example, XML, OGDL, YAML, CSV, and the like).

In an embodiment of the invention, the method further comprises the steps of monitoring each request of loading a definition of a new type from the target software component, and updating the available types according to each monitored request.

However, the available types may be provided in any other way, even not automatically (for example, by properly initializing the target software component).

In an embodiment of the invention, the types are classes and the target object is an instance of the selected candidate class. The steps of monitoring comprises receiving each request of loading the definition of the new class from the target software component by a class loader; the class loader controls the execution of said step of updating the available classes according to each monitored request.

However, the loading requests may be monitored in any other way (for example, by means of a wrapper for a standard class loader, or by means of hooking techniques).

In an embodiment of the invention, the representation of the source type comprises a set of (one or more) elements and each available type comprises a set of (one or more) fields. The step of determining a set of candidate types comprises the following steps. A set of loss indexes is calculated, each one for a corresponding available type; the loss index measures lost ones of the elements being not assignable to the fields of the available type. Each available type is set as a candidate type when the corresponding loss index does not reach a threshold.

However, the threshold may be configurable to any value (even dynamically); moreover, the candidate types may be determined in any way, even without calculating any loss index (for example, only considering the available types for which all the elements of the representation of the source object may be assigned to the fields thereof).

In an embodiment of the invention, each loss index comprises a number of the lost elements.

However, the loss index may be defined in any other way (for example, by taking into account the number of bits of the lost elements in addition or in alternative to their number).

In an embodiment of the invention, each element comprises a name and a value. The step of calculating a set of loss indexes comprises the following steps for each available type. Each element is set as a lost element when the available type lacks a getter method and a setter method for getting and setting, respectively, a field with the name of the element; the getter method and the setter method have a signature compatible with the value of the element.

However, the lost elements may be determined in any other way (for example, by examining the fields of the available types directly).

In an embodiment of the invention, the step of setting each element as a lost element comprises searching a pair of methods of the available type conforming to a naming convention comprising the name of the element together with a getter keyword and a setter keyword, respectively.

However, the getter/setter methods may be based on different naming conventions, or they may be determined in any other way (for example, by means of introspection techniques).

In an embodiment of the invention, the match metrics comprise the corresponding loss indexes. The step of calculating a set of match metrics further comprises the following steps. A set of excess indexes is calculated, each one for a corresponding available type; the excess index measures exceeding ones of the fields of the available type being not assignable by the elements.

However, the match metrics may be defined in any other way (for example, only according to the excess indexes, or more generally by any metric of one or more values that indicates a difference in information content between the candidate type and the representation of the source object).

In an embodiment of the invention, each excess index comprises a number of bits of the exceeding fields.

However, the excess index may defined in any other way (for example, by taking into account the number of the exceeding fields in addition or in alternative to the number of their bits).

In an embodiment of the invention, the step of selecting one of the candidate types according to the match metrics comprises selecting the candidate type having the lowest loss index first and the lowest excess index next.

However, the candidate type to be used to map the representation of the source object may be selected according to any other criteria (for example, weighting the loss index and the excess index, considering the number of exceeding fields first and their number of bits next, and so on).

In an embodiment of the invention, the step of selecting one of the candidate types according to the match metrics comprises selecting a matching one of the candidate types matching the representation of the source object with no lost element and no exceeding field during said step of determining a set of candidate types; the selecting of the matching candidate type causes the skipping of said step of calculating a set of match metrics.

However, this optimization may be omitted in a simplified implementation.

In general, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

Another embodiment of the present invention provides a computer program, which comprises code means for causing a data processing system to perform the steps of the above-described method when the computer program is executed on the data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in base-band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Another embodiment of the present invention provides a system, which comprises means for performing the steps of the same method.

However, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. It is also pointed out that (unless specified otherwise) any interaction between different components generally does not need to be continuous, and it may be either direct or indirect through one or more intermediaries. Moreover, the proposed method may also be carried out on a system based on a different architecture (for example, a local, wide area, cellular or satellite network), and exploiting any type of (wired and/or wireless) connections. However, its implementation on a stand-alone computer is not excluded. In any case, the computer may have another structure or may comprise similar elements (such as cache memories temporarily storing the programs or parts thereof); moreover, it is possible to replace the computer with any code execution entity, either based on a physical machine or a virtual machine (such as a PDA, a mobile phone, and the like), or with a combination of multiple entities (such as a multi-tier architecture, a grid computing infrastructure, and the like).

The invention claimed is:

1. A method for de-serializing a representation of a source object of a source software component written in a source language into a target software component written in a target language, the method comprising:
   receiving, by a processor, the representation of the source object,
   determining, by the processor, a set of candidate types among a plurality of available candidate types being available in the target language for the target software component, each candidate type in the set of candidate types being compatible with a representation of a source type of the source language, wherein the representation of the source type comprises a set of elements, wherein each of the plurality of available candidate types comprises a set of fields, and wherein determining the set of candidate types further comprises:
      calculating, by the processor, a set of loss indexes each one for a corresponding available candidate type, wherein each loss index of the set of loss indexes measures lost ones of the set of elements being not assignable to the set of fields of the available candidate type, and
      setting, by the processor, each available candidate type as a candidate type when the loss index corresponding to the available candidate type does not reach a threshold,
   calculating, by the processor, a set of match metrics, wherein each match metric corresponds to a candidate type and wherein the match metric being indicative of a difference in information content between the candidate type and the representation of the source type,
   selecting, by the processor, one of the set of candidate types according to the set of match metrics, and
   mapping, by the processor, the representation of the source type onto a target object of the selected candidate type.

2. The method according to claim 1, wherein the source language is a programming language featuring weak typing, wherein the target language is a programming language featuring strong typing, and wherein the representation of the source object is written in a language-independent format lacking semantics.

3. The method according to claim 2, wherein the source language is JavaScript, wherein the target language is Java, and wherein the language-independent format is JSON.

4. The method according to claim 1, further comprising:
   monitoring, by the processor, each request of loading a definition of a new candidate type from the target software component, and
   updating by the processor, the plurality of available candidate types according to each monitored request.

5. The method according to claim 4, wherein the plurality of available candidate types are a plurality of available candidate classes, wherein the target object is an instance of a selected candidate class, and wherein monitoring each request of loading the definition of the new candidate type from the target software component further comprises:
   receiving, by the processor, each request of loading the definition of a new candidate class from the target software component by a class loader, wherein the class loader controls the execution of the step of updating the plurality of available candidate classes according to each monitored request.

6. The method according to claim 1, wherein each loss index comprises a number of the lost elements.

7. The method according to claim 1, wherein each element comprises a name and a value and wherein calculating the set of loss indexes further comprises, for each available candidate type:
   setting, by the processor, each element as a lost element when the available candidate type lacks a getter method and a setter method for getting and setting, respectively, a field with the name of the element, wherein the getter method and the setter method having a signature compatible with the value of the element.

8. The method according to claim 7, wherein setting each element as the lost element further comprises:
   searching, by the processor, a pair of methods of the available candidate type conforming to a naming convention comprising the name of the element together with a getter keyword and a setter keyword, respectively.

9. The method according to claim 1, wherein the set of match metrics comprise the set of loss indexes corresponding to the set of available candidate types and wherein calculating the set of match metrics further comprises:
   calculating, by the processor, a set of excess indexes, wherein each excess index corresponds to an available candidate type and wherein the excess index measures exceeding ones of the set of fields of the available candidate type being not assignable by the set of elements.

10. The method according to claim 9, wherein each excess index comprises a number of bits of exceeding fields.

11. The method according to claim 9, wherein selecting one of the set of candidate types according to the set of match metrics further comprises:
    selecting, by the processor, the candidate type having a lowest loss index first and a lowest excess index next.

12. The method according to claim 9, wherein selecting one of the set of candidate types according to the set of match metrics further comprises:
    selecting, by the processor, a matching one of the candidate types matching the representation of the source type with no lost element and no exceeding field during determining the set of candidate types, wherein the selecting of the matching one of the candidate types causing skipping of calculating the set of match metrics.

13. A computer program product comprising a computer readable storage medium having a computer readable program stored therein, wherein the computer readable program, when executed on a computing device, causes the computing device to:
    receive the representation of the source object,
    determine a set of candidate types among a plurality of available candidate types being available in the target language for the target software component, each candidate type in the set of candidate types being compatible with a representation of a source type of the source language, wherein the representation of the source type comprises a set of elements, wherein each of the plurality of available candidate types comprises a set of fields, and wherein the computer readable medium to determine the set of candidate types further causes the computing device to:
        calculate a set of loss indexes each one for a corresponding available candidate type, wherein each loss index of the set of loss indexes measures lost ones of the set of elements being not assignable to the set of fields of the available candidate type, and
        set each available candidate type as a candidate type when the loss index corresponding to the available candidate type does not reach a threshold,
    calculate a set of match metrics, wherein each match metric corresponds to a candidate type and wherein the match metric being indicative of a difference in information content between the candidate type and the representation of the source type,
    select one of the set of candidate types according to the set of match metrics, and
    map the representation of the source type onto a target object of the selected candidate type.

14. The computer program product according to claim 13, wherein the computer readable program further causes the computing device to:
    monitor each request of loading a definition of a new candidate type from the target software component, and
    update the plurality of available candidate types according to each monitored request.

15. The computer program product according to claim 14, wherein the plurality of available candidate types are a plurality of available candidate classes, wherein the target object is an instance of a selected candidate class, and wherein the computer readable program to monitor each request of loading the definition of the new candidate type from the target software component further causes the computing device to:
    receive each request of loading the definition of a new candidate class from the target software component by a class loader, wherein the class loader controls the execution of the instructions to update the plurality of available candidate classes according to each monitored request.

16. A system comprising:
    a processor; and
    a memory coupled to the processor, wherein the memory comprises instructions which, when executed by the processor, cause the processor to:
    receive the representation of the source object,
    determine a set of candidate types among a plurality of available candidate types being available in the target language for the target software component, each candidate type in the set of candidate types being compatible with a representation of a source type of the source language, wherein the representation of the source type comprises a set of elements, wherein each of the plurality of available candidate types comprises a set of fields, and wherein the instructions to determine the set of candidate types further cause the processor to:
        calculate a set of loss indexes each one for a corresponding available candidate type, wherein each loss index of the set of loss indexes measures lost ones of the set of elements being not assignable to the set of fields of the available candidate type, and
        set each available candidate type as a candidate type when the loss index corresponding to the available candidate type does not reach a threshold,
    calculate a set of match metrics, wherein each match metric corresponds to a candidate type and wherein the match metric being indicative of a difference in information content between the candidate type and the representation of the source type,
    select one of the set of candidate types according to the set of match metrics, and
    map the representation of the source type onto a target object of the selected candidate type.

17. The system according to claim 16, wherein the source language is a programming language featuring weak typing, wherein the target language is a programming language featuring strong typing, and wherein the representation of the source object is written in a language-independent format lacking semantics.

18. The system according to claim 17, wherein the source language is JavaScript, wherein the target language is Java, and wherein the language-independent format is JSON.

19. The system according to claim 16, wherein the instructions further cause the processor to:
    monitor each request of loading a definition of a new candidate type from the target software component, and
    update the plurality of available candidate types according to each monitored request.

20. The system according to claim 19, wherein the plurality of available candidate types are a plurality of available candidate classes, wherein the target object is an instance of a selected candidate class, and wherein the instructions to monitor each request of loading the definition of the new candidate type from the target software component further cause the processor to:
    receive each request of loading the definition of a new candidate class from the target software component by a class loader, wherein the class loader controls the execution of the instructions to update the plurality of available candidate classes according to each monitored request.

* * * * *